United States Patent
Martin et al.

(10) Patent No.: US 10,086,861 B1
(45) Date of Patent: Oct. 2, 2018

(54) TRANSPORT WHEEL RESTRAINT

(71) Applicant: Toyota Motor Engineering & Manufacturing North America, Inc., Erlanger, KY (US)

(72) Inventors: James Hendrik Martin, Cambridge (CA); Dwayne Joey Kennedy, Kitchener (CA); William Cody Willems, Waterloo (CA); William Dwayne Peach, Kitchener (CA); Deron Arthur Weber, Cambridge (CA)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/468,514

(22) Filed: Mar. 24, 2017

(51) Int. Cl.
  *B62B 5/04* (2006.01)
  *B60T 3/00* (2006.01)
  *B65G 69/00* (2006.01)

(52) U.S. Cl.
  CPC .............. *B62B 5/0495* (2013.01); *B60T 3/00* (2013.01); *B65G 69/005* (2013.01)

(58) Field of Classification Search
  CPC ......... B62B 5/049; B62B 5/0495; B60T 3/00; B65G 69/005
  USPC ............ 188/32, 36; D12/217; 414/401, 462; 410/30, 49, 66, 94
  See application file for complete search history.

(56) References Cited

U.S. PATENT DOCUMENTS

| | | | | |
|---|---|---|---|---|
| 1,379,398 A | * | 5/1921 | Duffy | B61K 7/20 104/258 |
| 3,391,760 A | | 7/1968 | Gonser | |
| 3,734,241 A | * | 5/1973 | Hale | B60T 3/00 188/32 |
| 3,858,690 A | * | 1/1975 | Facemire | B60T 3/00 188/32 |

(Continued)

OTHER PUBLICATIONS

Custom Equipment Company, "Wesco 272949 Black Pallet Jack Stop", Retrieved from the Internet: <https://www.custommhs.com/index.php?route=product/search&keyword=272949>, Retrieved Mar. 22, 2017, 2 pages.

(Continued)

*Primary Examiner* — Thomas J Williams
*Assistant Examiner* — Mariano Sy
(74) *Attorney, Agent, or Firm* — Christopher G. Darrow; Darrow Mustafa PC

(57) ABSTRACT

Systems and methods are provided for restraining the movement of a wheeled transport apparatus using a restraining device. The restraining device may include an elongated frame component having an upstanding rear portion and a base portion. The base portion is configured to be secured to a floor surface. A loading member may be provided, located adjacent the elongated frame component. The loading member defines a ramp surface to guide a rotational movement of a wheel of the wheeled transport apparatus into a receiving space. In certain aspects, the elongated frame component comprises an angle iron defining a length and having a substantially uniform L-shaped cross-section. The device may further include a locking member pivotally coupled to the elongated frame component and configured to retainingly engage a structural component of the wheeled transport apparatus.

20 Claims, 6 Drawing Sheets

(56) References Cited

U.S. PATENT DOCUMENTS

| | | | | |
|---|---|---|---|---|
| 4,911,270 A | * | 3/1990 | Hudson | B60T 3/00 188/32 |
| 5,427,209 A | * | 6/1995 | Tannehill | B60S 3/00 188/32 |
| D401,210 S | * | 11/1998 | Chiang | 188/32 |
| 5,839,863 A | | 11/1998 | Johansson | |
| 6,290,029 B1 | * | 9/2001 | Gubler | B60T 3/00 188/36 |
| 6,648,103 B2 | * | 11/2003 | Scheffer | B60T 3/00 188/1.11 E |
| 6,742,752 B1 | | 6/2004 | Fenyves et al. | |
| 7,581,623 B1 | * | 9/2009 | Egnor | B60T 3/00 188/32 |
| 9,227,799 B2 | * | 1/2016 | Brooks | B65G 69/003 |
| 2005/0047887 A1 | | 3/2005 | Kenny | |
| 2012/0087758 A1 | | 4/2012 | Anderson et al. | |
| 2013/0292214 A1 | | 11/2013 | Brooks et al. | |
| 2015/0217951 A1 | * | 8/2015 | Lessard | B65G 69/28 414/401 |
| 2017/0341883 A1 | * | 11/2017 | Boston | B65G 69/003 |

OTHER PUBLICATIONS

Lift N Shift, "Pallet Truck Stop (PH-02)—Lift n Shift", Retrieved from the Internet: <http://www.lift-n-shift.com/product/pallet-truck-stop-ph-02/>, Retrieved Mar. 22, 2017, 4 pages.

\* cited by examiner

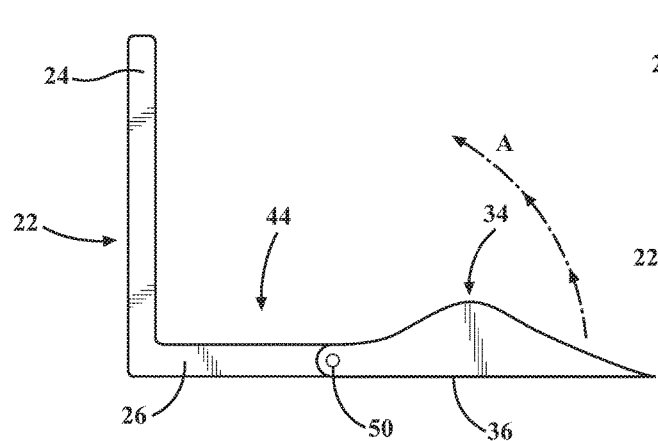
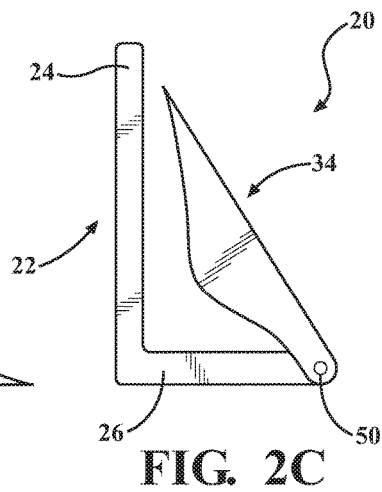
FIG. 2B    FIG. 2C
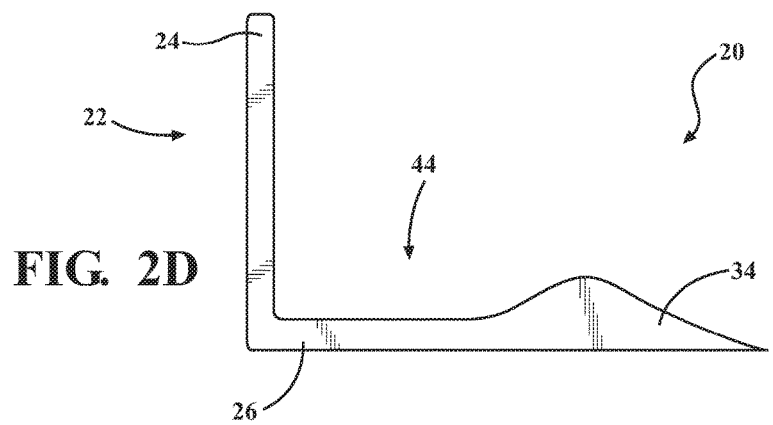
FIG. 2D
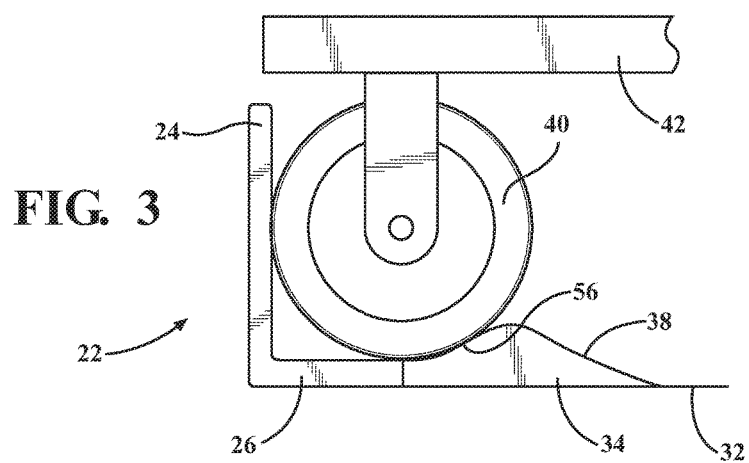
FIG. 3

TRANSPORT WHEEL RESTRAINT

TECHNICAL FIELD

The present disclosure generally relates to a wheel restraint system and, more particularly, to systems and methods of braking a mobile transport vehicle, cart, or dolly.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Mobile transport vehicles, such as dollies, hand carts, hand trucks, and pallet jacks may be used to transport materials or items throughout a facility, or used for various loading and unloading purposes. Preventing a parked or stationary transport vehicle from inadvertently moving forward or rearward is an important safety consideration. In general, the most common wheel restraint is simply a portable wheel chock that wedges between the ground/roadway and the underside of the wheel. However, wheel chocks may often slip out of position when the ground/roadway is slippery due to oil or other debris, such as sand, gravel, or dirt that may be present. Moreover, wheel chocks are usually loose items that do not permanently attach to the loading dock area, so they may often get misplaced. In other aspects, certain transport vehicles may include a tow motor upon which a driver stands during movement. In order to apply a pressure brake, the driver may have to step off and leave his position, which may compromise safety in a busy area, adversely affect ergonomics, and/or increase time and expense.

Accordingly, it would be desirable to provide an improved wheel restraint system that is still capable of meeting various safety considerations.

SUMMARY

This section provides a general summary of the disclosure, and is not a comprehensive disclosure of its full scope or all of its features.

In various aspects, the present teachings provide a restraining device for a wheeled transport apparatus. The restraining device may include an elongated frame component having an upstanding rear portion and a base portion. The base portion is configured to be secured to a floor surface. A loading member may be provided, located adjacent the elongated frame component. The loading member defines a ramp surface to guide the rotational movement of a wheel of the wheeled transport apparatus into a receiving space. In certain aspects, the elongated frame component comprises an angle iron defining a length and having a substantially L-shaped cross-section. The device may further include a locking member pivotally coupled to the elongated frame component and configured to retainingly engage a portion of the wheeled transport apparatus.

In other aspects, the present teachings provide a restraining system for a wheeled transport apparatus. The restraining system may include an elongated frame component having an upstanding rear portion and a base portion configured to be secured to a floor surface. The system may further include an actuator lever assembly and a locking member. The locking member may be movably coupled to the actuator lever, and be configured to retainingly engage a structural component of the wheeled transport apparatus. The actuator lever assembly may be movably coupled to the rear portion of the elongated frame component, and the locking member may be rotatably coupled to both the actuator lever assembly and the base portion of the elongated frame component.

In still other aspects, the present teachings provide a method for restraining movement of a wheeled transport apparatus. The method may include rolling the wheeled transport apparatus adjacent a restraining system. The restraining system may include an elongated frame component having an upstanding rear portion and a base portion. The base portion is configured to be secured to a floor surface. An actuator lever assembly may be provided having first and second engagement plates. A locking member may be provided, movably coupled to the actuator lever assembly and configured to retainingly engage a structural component of the wheeled transport apparatus. The method may include aligning the structural component of the wheeled transport apparatus with the first engagement plate. The method further includes urging the structural component of the wheeled transport apparatus against the first engagement plate, moving the first engagement plate toward the upstanding rear portion of the frame component and causing a pivotal movement of the locking member that, in turn, engages the structural component.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein:

FIGS. 2B-2C are cross-sectional views of the wheel restraint device taken along the line 2-2 of FIG. 1 according to a second aspect where the loading member is movably coupled to the base portion;

FIG. 2D is a cross-sectional view of the wheel restraint device taken along the line 2-2 of FIG. 1 according to a third aspect where the elongated frame component and the loading member are formed as one component;

FIG. 3 illustrates a wheel of a transport vehicle disposed within a receiving space defined by the restraining device as shown in FIG. 2A;

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present technology generally provides a restraining device for a wheeled transport apparatus. In various aspects, the restraining device may be permanently affixed or coupled to a floor, a ground surface, or the like. The restraining device may ultimately define a receiving space for receiving at least one wheel of a transport vehicle, and may include an elongated frame component having an upstanding rear portion and a base portion. The base portion is typically configured to be secured to the floor or ground surface. A loading member may be provided, located adjacent the elongated frame component. The loading member may define a ramp surface to guide the rotational movement of a wheel of the wheeled transport apparatus into a receiving space. In certain aspects, the elongated frame component comprises an angle iron defining a length and having a substantially L-shaped cross-section. The device may further include a locking member pivotally coupled to the elongated frame component and configured to retainingly engage a portion of the wheeled transport apparatus.

Figure 1:
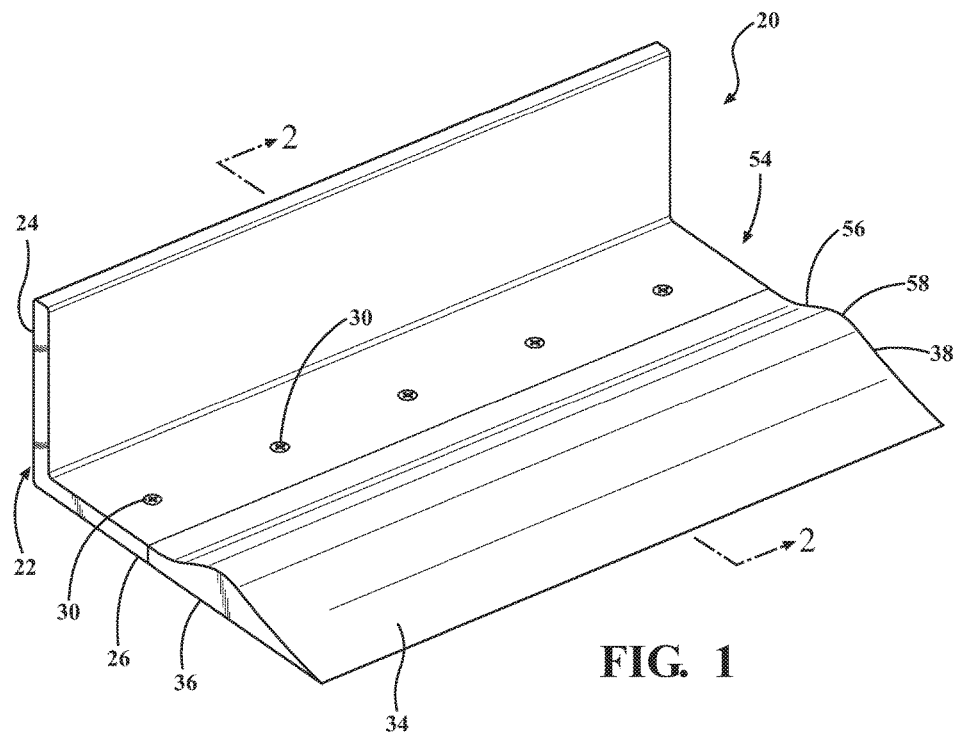
FIG. 1 is a perspective view of one exemplary restraining device according to the present disclosure.
Figure 2A:
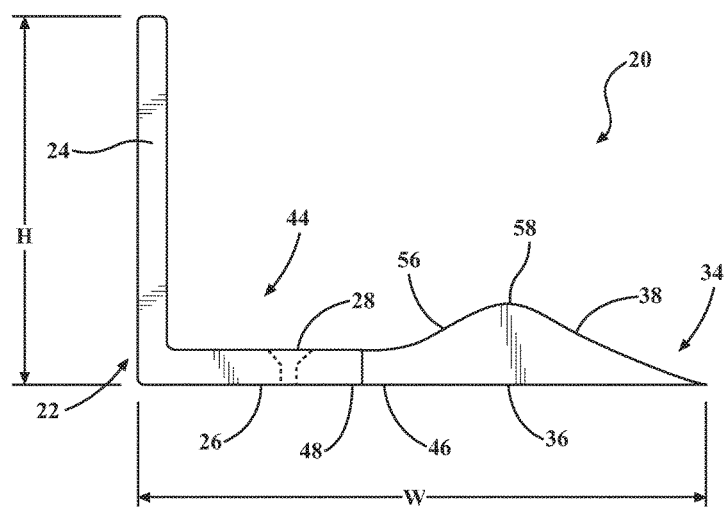
FIG. 2A is a cross-sectional view of the wheel restraint device taken along the line 2-2 of FIG. 1 according to a first aspect.

With reference to the drawings, FIG. 1 is a perspective view of one exemplary restraining device 20 according to a first aspect of the present disclosure. FIG. 2A is a cross-sectional view of the wheel restraint device taken along the line 2-2 of FIG. 1. As shown, the device 20 includes an elongated frame component 22 that has an upstanding rear portion 24 and a base portion 26 that is shown as being substantially perpendicular to the upstanding rear portion 24. The height (H) of the rear portion 24 and width (W) of the base portion 26 may vary depending upon the size of the wheels of the transport vehicle to be restrained. In various aspects, the wheeled transport apparatus may be one of a transport vehicle, a trailer, a dolly, a hand cart, a hand truck, a pallet jack, and the like. Common wheel sizes may include 4 inch and 8 inch diameter wheels. In the example of a 4 inch wheel, the upstanding rear portion 24 may be about 5 inches high, and the base portion 26 may be about 3 inches wide.

The overall length dimension of the restraining device 20 may vary depending on the location of installation and the desired number of transport vehicles that the device 20 will service at one time. The thickness of the elongated frame component 22 may vary depending on the type of transport vehicle and the amount of load carried thereon, and can typically range from about ¼ inch, to about ⅜ inch, and up to about ½ inches, or greater. In various aspects, the elongated frame member 22 may be made of commercially available angle iron having a substantially uniform L-shaped cross-section along its length. The base portion 26 of the elongated frame component 22 may be provided with a plurality of spaced apart apertures 28 that provide means for a plurality of mechanical fasteners 30 to fixedly secure the base portion 26 to the ground or floor surface 32. In other aspects, the base portion 26 may be secured with an appropriate adhesive, or the like. In certain aspects, if is it desired to place the restraining device 20 adjacent a step, curb, or the like, it may be appropriate to mechanically secure the upstanding rear portion 24 to the step or curb, either in addition to, or in place of fixedly securing the base portion 26 to the floor surface 32.

A loading member 34 may be provided, located adjacent the base portion 26 of the elongated frame component 22. The loading member 32 may define a planar bottom surface 36, and define at least one ramp surface 38 that may serve to guide a rotational movement of the wheel(s) 40 (FIG. 3) of the transport apparatus 42 into a receiving space 44 that is defined by at least a portion of the elongated frame component 22 and the loading member 34. As shown in FIG. 2A, the loading member 34 may be a separate component, arranged having a proximal edge 46 of the loading member 34 placed adjacent to an edge 48 of the base portion 26 of the elongated frame component 22. The respective edges 46, 48 may be directly adjacent, or in contact with one another, or they be separated by a predetermined distance. In other aspects, the elongated frame member 22 may be oriented in a reverse configuration, where the base portion 26 faces the opposite direction, and thus is not in direct contact the loading member 34, as will be discussed with respect to FIG. 7, below. The loading member 34 may be separately secured to the floor or ground surface 32 using mechanical fasteners or an adhesive, as described above. In various aspects, the loading member 34 is rated and configured to withstand receiving a load of greater than at least 1,000 pounds, or greater than about 2,500 pounds, or even greater than about 4,000 pounds. Depending on the rating and load requirements, the loading member 34 may be made of a suitable resilient material selected from the group consisting of at least one of steel; iron; aluminum; rubber; plastic; and composites, mixtures, and alloys thereof. Various portions of the restraining device 20 may be painted or otherwise coated in order to protect the finish of the device 20, such as preventing corrosion, and/or to provide visible indications for safety considerations.

FIG. 2B-2C are cross-sectional views of the wheel restraint device taken along the line 2-2 of FIG. 1 according to a second aspect where the loading member 34 is movably coupled to the base portion 26. For example, a hinge 50 or suitable coupling mechanism may be provided for rotational movement of the loading member 34 about an axis with respect to the elongated frame component 22. In various aspects, the loading member 34 may be rotated in an upward direction, as indicated by directional arrow A in FIG. 2B, and rest adjacent the upstanding rear portion 24 in order to save space while not in use as shown in FIG. 2C. In this regard, the loading member 34 may be replaced with different sizes, if appropriate.

FIG. 2D is a cross-sectional view of the wheel restraint device taken along the line 2-2 of FIG. 1 according to a third aspect where the elongated frame component 22 and the loading member are formed as one component. In this regard, it may be desired that the elongated frame component 22 and the loading member 34 are formed as one unitary, monolithic piece, for example, using extrusion, molding, or suitable casting techniques.

As shown in FIGS. 2A-2D, the elongated frame component 22 and the loading member 34 cooperate to define the receiving space 44 to accept and retain at least one wheel 40 of the transport apparatus 42. In various aspects, the receiving space 44 may define a channel 54, best shown in FIG. 1, extending an entirety of a length dimension of the elongated frame component 22. FIG. 3 illustrates a wheel 40 of a transport apparatus 42 (only partially depicted) disposed within a receiving space 44 defined by the restraining device 20 as shown in FIG. 2A. As shown, the loading member 34 may define a first ramp surface 38 to guide the wheel 40 into the receiving space 44 and a second opposing ramp surface 56 to retain the wheel 40 within the receiving space 44, and to assist guiding the wheel back up and out of the receiving space 44 when it is desired to move the transport apparatus 42 out from its resting position in the restraining device 20. The ramp surfaces 38, 56 may vary in size and shape. A small apex area 58 may be provided between the first and second ramp surfaces 38, 56. In various aspects, the wheel 40 may be in contact with, and held in place by, both the upstanding rear wall 24 and the opposing ramp surface 56.

Figure 4A:
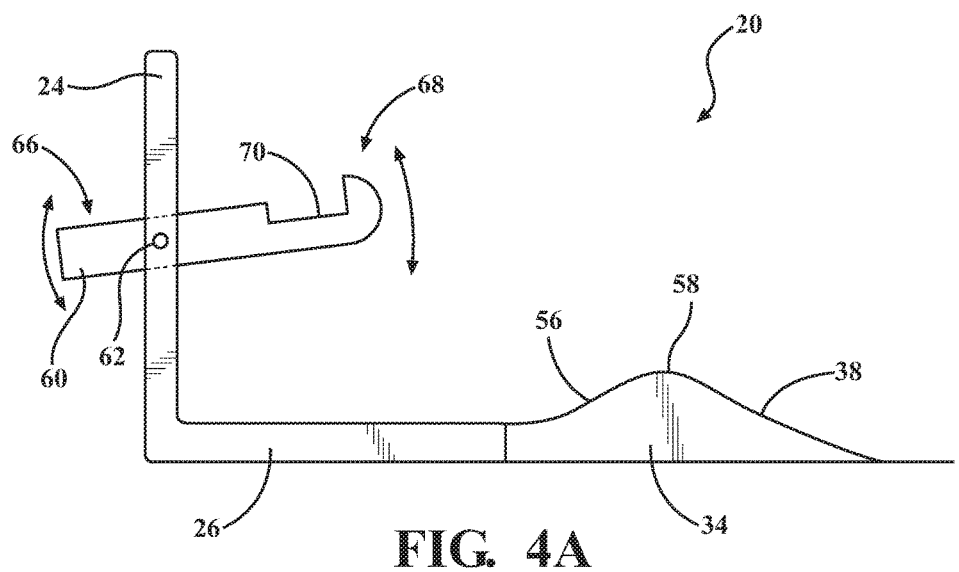
FIG. 4A illustrates a side schematic view of a wheel restraint device similar to that shown in FIG. 1, further including a locking member pivotally coupled to the elongated frame component for engaging and retaining a structural component of the wheeled transport apparatus.

FIG. 4A illustrates a side schematic view of a wheel restraint device similar to that shown in FIG. 1, further including a locking member 60 pivotally coupled to the elongated frame component 34 at an axis 62. The locking member 60 may be shaped in a variety of different designs, as long as it is configured for engaging and retaining a structural component of the wheeled transport apparatus 42. In one example, the structural component could be an extension 64 from the underside of a frame of the transport apparatus 42. As shown, the locking member 60 may define an engagement portion 66, for example, outwardly extending a distance from the upstanding rear portion 26, and a locking portion 68 inwardly extending a distance from the upstanding rear portion 26. The upstanding rear portion 26 may be provided with a suitable aperture to enable the passage and rotational movement of the locking member 60 between operational positions. In operation, the downward and upward movement of the engagement portion 66, for example, with movement initiated by a user's foot or the like, pivots the locking portion 68 respectively between a locked position and an unlocked position.

Figure 4B:
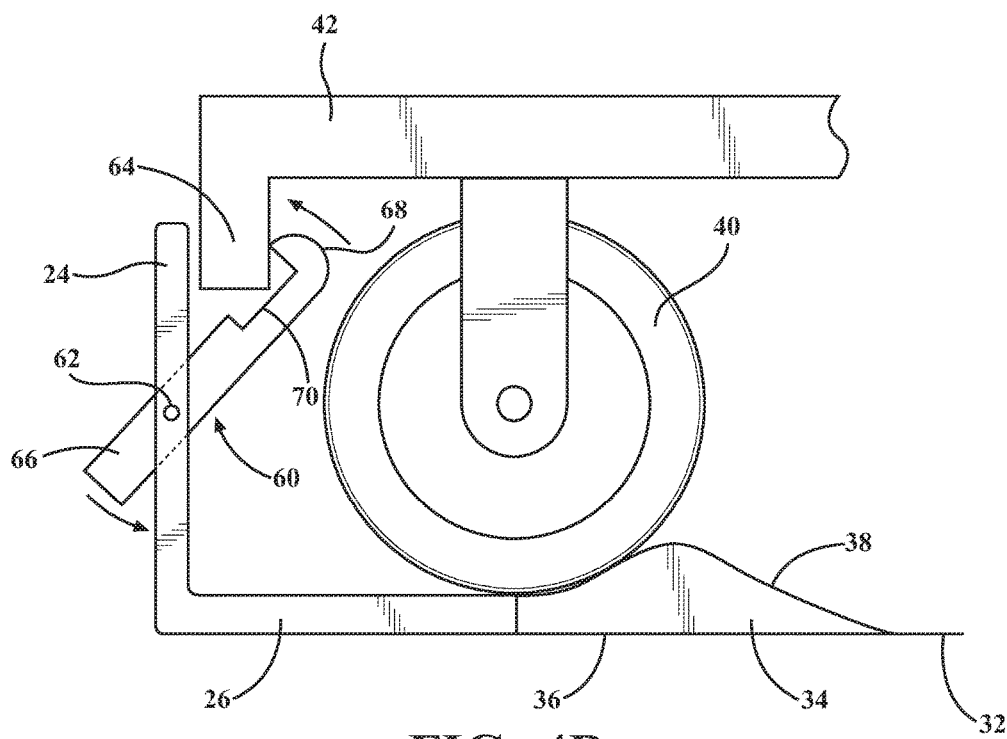
FIG. 4B illustrates a side schematic view of the wheel restraint device of FIG. 4A with the locking member in an engaged position.

FIG. 4B illustrates the wheel restraint device of FIG. 4A with the locking member 60 in an engaged, or locked position. In various aspects, the locking portion 68 may define a cut-out 70, a lip, or any other similar retaining feature configured to retainingly engage a cooperating portion or structural component 64 of the transport vehicle 42. One or more biasing members may also be provided to urge and/or retain the locking member 60 in a desired locked or unlocked position.

Figure 5A:
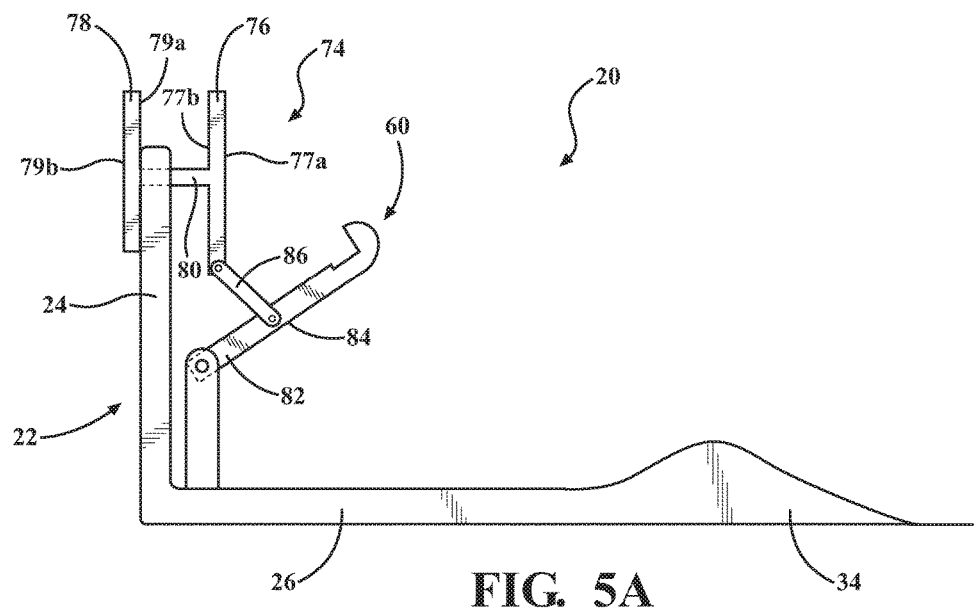
FIG. 5A illustrates a side schematic view of a wheel restraining device according to another aspect of the present disclosure and includes an actuator lever assembly and a locking member in a first position.

FIG. 5A illustrates a side schematic view of a wheel restraining device 20 according to another aspect of the present disclosure, in a first, unlocked position. As shown, the device 20 includes an actuator lever assembly 74 configured to engage and release the locking member 60 that is movably coupled to the actuator lever assembly 74. For example, the locking member 60 is similarly movable between various positions to retainingly engage a structural component 72 of the transport apparatus 42. In various aspects, the actuator assembly 74 may include a pair of spaced-apart, substantially planar engagement plates 76, 78 joined with a coupling member 80 that may extend through an aperture defined in the upstanding rear portion 24 of the elongated frame component 22.

In the non-limiting example shown, a bottom portion 82 of the locking member 60 may be movably coupled to the base portion 26 of the elongated frame component 22 at a bottom hinge 82, or with a similar type of fastening mechanism. A mid-central region 84 of the locking member is also hingedly coupled to an intermediate linkage 86 that is, in turn, hingedly coupled to the actuator lever assembly 74, for example, at the bottom region 88 of the first engagement plate 76.

In operation, the first engagement plate 76 defines an outer surface 77a that is configured for alignment with and coordinated movement with a lower portion 90 of the wheeled apparatus 42. For example, after aligning the lower portion 90 with the outer surface 77a of the first engagement plate 76, the lower portion 90 can be further urged against the plate 76 in a direction toward the upstanding rear portion 24 as shown by the directional arrow B in FIG. 5B. The engagement plate 76 can continue to move in direction B until the inner surface 77b meets up against the upstanding rear portion 24. As the engagement plate 76 moves, the intermediate linkage 86 is also moved which, in turn, rotates the locking member 60 upward toward a locking position.

When it is desired to unlock and release the engagement of the structural component of the transport apparatus, the second engagement plate 78 needs to be urged in a direction toward the transport apparatus 42. In one example, a user may press the outer surface 79b of the second engagement plate 78, which in turn, causes a reverse pivotal movement of the locking member 60. This action releases the locking member from engagement with the structural component and moves the outer surface 77a of the first plate 76 against the exterior of the transport apparatus.

Figure 5B:
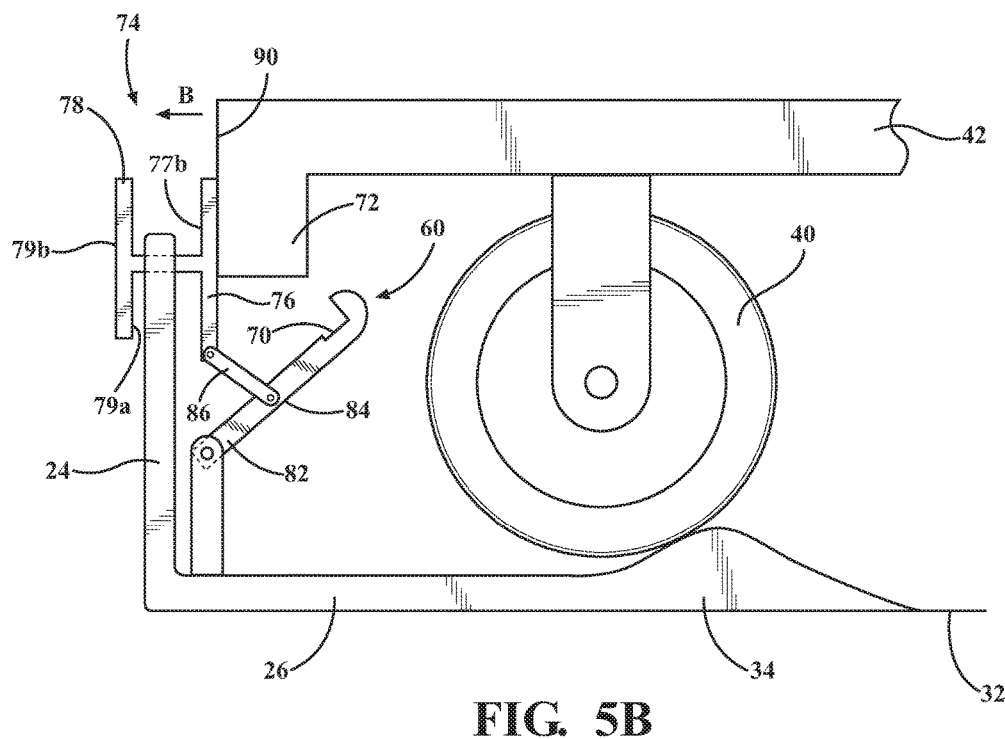
FIG. 5B illustrates the wheel restraining device of FIG. 5A in an intermediate second position as it engages a structural component of the transport vehicle.
Figure 5C:
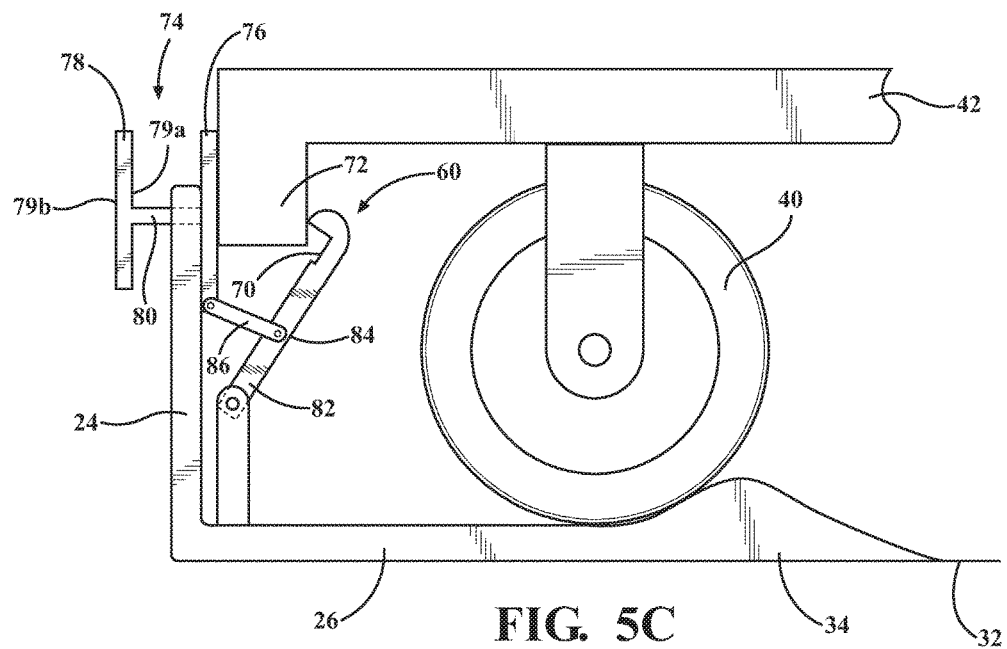
FIG. 5C illustrates the wheel restraining device of FIG. 5A in a locked position.
Figure 5D:
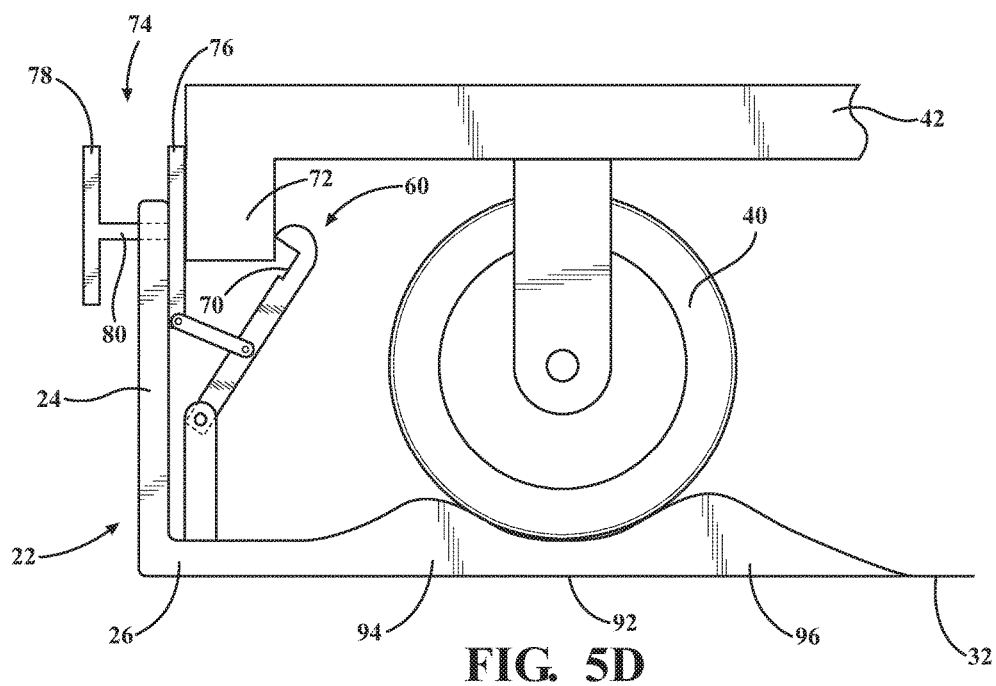
FIG. 5D illustrates another aspect of the disclosure with an alternate, chock-type, loading member.

FIG. 5B illustrates the wheel restraining device of FIG. 5A in an intermediate position as the first engagement plate 76 makes contact with a structural component 90 of the transport apparatus 42, and the transport apparatus 42 is urged in a direction toward the upstanding rear portion 24. FIG. 5C illustrates the wheel restraining device of FIG. 5A in a fully locking position. FIG. 5D illustrates yet a further embodiment with an alternative loading member 92 comprising first and second upstanding ramp portions 94, 96 that may serve similar in nature and function to a traditional wheel chock device. As discussed above, with reference to FIGS. 2A-2C, the alternative loading member 92 may be located adjacent the elongated frame component 22, may be movably coupled to the elongated frame component 22, or there may be a separation distance there between. In still other aspects, the elongated frame component 22 and the alternative loading member 92 may be formed as one monolithic component, for example, using extrusion, molding, or casting techniques.

Figure 6:
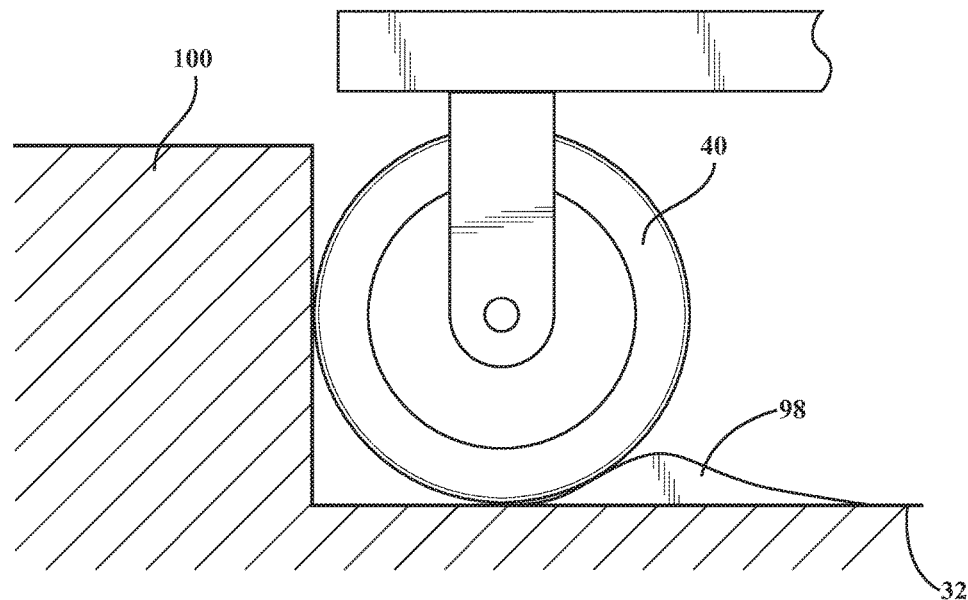
FIG. 6 illustrates a side schematic view of an additional aspect of the wheel restraining device without using an elongated frame component.

FIG. 6 illustrates a side schematic view of yet another aspect of the wheel restraining device without using any elongated frame component. In this aspect, the wheel 40 of a transport apparatus may be placed between a curb 100 or step area and a modified loading member 98 may be used, secured to the floor 32 using mechanical fasteners or adhesive as described above. The modified loading member 98 may define similar ramp surfaces to both ease the wheel into a receiving space and maintain the wheel 40 between the curb 100 and the loading member 98.

Figure 7:
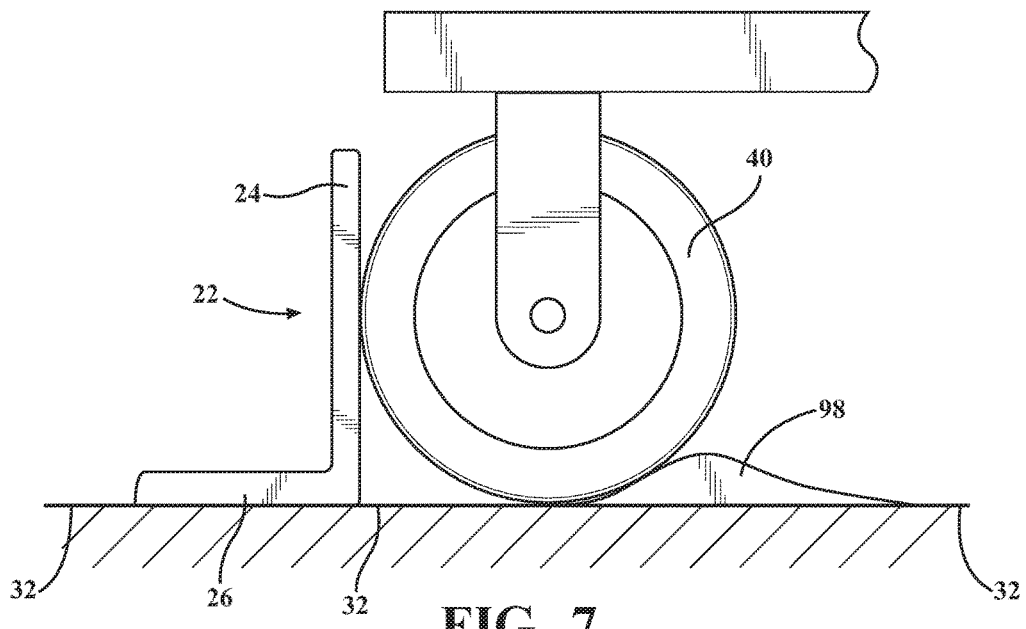
FIG. 7 illustrates a side schematic view of yet another aspect, with the L-shaped elongated frame component facing the opposite direction as that of FIG. 1.

Lastly, FIG. 7 illustrates yet another aspect of the present technology, where the L-shaped elongated frame component 22 is oriented in the opposite direction, and where the base portion 26 does not come into contact with the loading member 34, but still cooperates to define a wheel retention space to prevent movement of a transport apparatus.

The present disclosure also relates to methods of restraining a wheel of a wheeled transport apparatus. The method may include rolling the wheeled transport apparatus 42 adjacent a restraining system 20. The restraining system may include an elongated frame component 22 having an upstanding rear portion 24 and a base portion 26. The base portion 26 may be configured to be secured to a floor surface 32, as discussed above. A loading member 34 may be located adjacent the elongated frame member 22, and include one or more ramp surfaces 38, 56. The end wheel 40 of the transport apparatus 42 may be urged over a first ramp surface 38 and retained between a second ramp surface 56 and the upstanding rear wall portion 24 as shown in FIG. 3.

In certain other aspects, a locking member 60 can be provided to additionally secure the wheeled transport apparatus 42 as shown in FIGS. 4A-4B. In still other aspects, an actuator lever assembly 74 may be provided having first and second engagement plates 76, 78. A locking member 60 may be provided, movably coupled to the actuator lever assembly 74 and configured to retainingly engage a structural component 72 of the wheeled transport apparatus 42. The methods may include aligning an exterior portion 90 of the structural component 72 of the wheeled transport apparatus 42 with the first engagement plate 76. The method further includes urging the exterior portion 90 of the structural component 72 of the wheeled transport apparatus 42 against the first engagement plate, thereby moving the first engagement plate 76 toward the upstanding rear portion 24 of the elongated frame component 22 and causing a pivotal movement of the locking member 60 that, in turn, engages an adjacent portion of the structural component 72. The method may further include positioning the wheel 40 of the wheeled transport apparatus 42 within a defined receiving space 44, which may include locating the wheel 40 adjacent a ramp surface of a suitable loading member.

In various aspects when it is desired to release the transport apparatus 42, a user may urge the second engagement plate 78 of the actuator lever assembly 74 in a direction toward the wheeled transport apparatus 42 and causing a reverse pivotal movement of the locking member 60 that, in turn, releases the engagement with the structural component 72. The transport apparatus 42 can then be further moved in a direction away from the restraining device 20.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A restraining device for a wheeled transport apparatus, the restraining device comprising:
    an elongated frame component having an upstanding rear portion and a base portion configured to be secured to a floor surface;
    a loading member located adjacent the elongated frame component and defining a ramp surface to guide a rotational movement of a wheel of the wheeled transport apparatus into a receiving space defined by the elongated frame component and the loading member; and
    a locking member pivotally coupled to the elongated frame component and configured to retainingly engage a structural component of the wheeled transport apparatus, wherein the locking member defines an engagement portion outwardly extending a distance from the upstanding rear portion and a locking portion inwardly extending a distance from the upstanding rear portion.

2. The restraining device according to claim 1, wherein the elongated frame component and the loading member are formed as one unitary, monolithic piece.

3. The restraining device according to claim 1, wherein the loading member is movably coupled to the base portion of the elongated frame component, rotatable about an axis.

4. The restraining device according to claim 1, wherein the receiving space defines a channel extending an entirety of a length of the elongated frame component.

5. The restraining device according to claim 1, wherein the loading member defines a first ramp surface to guide the wheel into the receiving space, and defines a second opposing ramp surface to retain the wheel in the receiving space.

6. The restraining device according to claim 1, wherein the elongated frame component comprises an angle iron defining a length and having a substantially uniform L-shaped cross-section along the length.

7. The restraining device according to claim 1, wherein the base portion defines a plurality of spaced apart apertures configured for receiving mechanical fasteners for securing the elongated frame component to the floor surface.

8. The restraining device according to claim 1, wherein downward and upward movement of the engagement portion pivots the locking portion respectively between a locked position and an unlocked position.

9. The restraining device according to claim 1, further comprising:
an actuator lever assembly,
wherein the locking member is movably coupled to the actuator lever assembly and configured to retainingly engage a structural component of the wheeled transport apparatus.

10. The restraining device according to claim 1, wherein the wheeled transport apparatus is one of a transport vehicle, a trailer, a dolly, a hand cart, a hand truck, a pallet jack.

11. The restraining device according to claim 1, wherein the loading member is configured to withstand receiving a load of greater than at least 1,000 pounds and comprises a resilient material selected from the group consisting of at least one of steel; iron; aluminum; rubber; plastic; and composites, mixtures, and alloys thereof.

12. A restraining device for a wheeled transport apparatus, the restraining device comprising:
an elongated frame component having an upstanding rear portion and a base portion configured to be secured to a floor surface;
a loading member located adjacent the elongated frame component and defining a ramp surface to guide a rotational movement of a wheel of the wheeled transport apparatus into a receiving space defined by the elongated frame component and the loading member;
an actuator lever assembly; and
a locking member movably coupled to the actuator lever assembly and configured to retainingly engage a structural component of the wheeled transport apparatus,
wherein the actuator lever assembly is movably coupled to the upstanding rear portion of the elongated frame component and comprises a pair of substantially planar, spaced-apart engagement plates, and the locking member is rotatably coupled to both the actuator lever assembly and the base portion of the elongated frame component.

13. A restraining system for a wheeled transport apparatus, the restraining system comprising:
an elongated frame component having an upstanding rear portion and a base portion configured to be secured to a floor surface;
an actuator lever assembly;
a locking member movably coupled to the actuator lever assembly and configured to retainingly engage a structural component of the wheeled transport apparatus,
wherein the actuator lever assembly comprises a first engagement plate configured for coordinated movement with a portion of the wheeled transport apparatus to engage the locking member, and a second engagement plate configured to release the locking member from engagement with the structural component of the wheeled transport apparatus.

14. The restraining system according to claim 13, further comprising a loading member located adjacent the elongated frame component and defining a ramp surface to guide a rotational movement of a wheel of the wheeled transport apparatus into a receiving space defined by the elongated frame component and the loading member.

15. The restraining system according to claim 14, wherein the actuator lever assembly is movably coupled to the upstanding rear portion of the elongated frame component, and the locking member is rotatably coupled to both the actuator lever assembly and the base portion of the elongated frame component.

16. A restraining system for a wheeled transport apparatus, the restraining system comprising:
an elongated frame component having an upstanding rear portion and a base portion configured to be secured to a floor surface;
an actuator lever assembly;
a locking member movably coupled to the actuator lever assembly and configured to retainingly engage a structural component of the wheeled transport apparatus; and
a wheel chock located a predetermined distance away from the elongated frame component and configured to receive a wheel of the wheeled transport apparatus concurrent with the locking member engaging the structural component of the wheeled transport apparatus.

17. A method for restraining movement of a wheeled transport apparatus, the method comprising:
rolling the wheeled transport apparatus adjacent a restraining system, the restraining system comprising:
an elongated frame component having an upstanding rear portion and a base portion configured to be secured to a floor surface;
an actuator lever assembly having first and second engagement plates; and
a locking member movably coupled to the actuator lever assembly and configured to retainingly engage a structural component of the wheeled transport apparatus;
aligning a portion of the structural component of the wheeled transport apparatus with the first engagement plate; and
urging the structural component of the wheeled transport apparatus against the first engagement plate, thereby moving the first engagement plate and causing a pivotal movement of the locking member that, in turn, engages the structural component.

18. The method according to claim 17, further comprising positioning a wheel of the wheeled transport apparatus within a defined receiving space.

19. The method according to claim 17, further comprising moving the second engagement plate of the actuator lever assembly in a direction toward the wheeled transport apparatus and causing a reverse pivotal movement of the locking member that, in turn, releases an engagement with the structural component.

20. The method according to claim 17, wherein moving the first engagement plate comprises moving the first engagement plate in a direction toward the upstanding rear portion of the elongated frame component.

* * * * *